United States Patent [19]

Vacík et al.

[11] Patent Number: 4,956,432
[45] Date of Patent: Sep. 11, 1990

[54] HYDROPHILIC TRANSPARENT CROSSLINKED COPOLYMER AND THE METHOD FOR PRODUCING THEREOF

[75] Inventors: Jiří Vacík; Blahoslav Obereigner; Dana Součková, all of Prague, Czechoslovakia

[73] Assignee: Ceskoslovenska akademie ved, Prague, Czechoslovakia

[21] Appl. No.: 362,763

[22] Filed: Jun. 7, 1989

[30] Foreign Application Priority Data

Jun. 8, 1988 [CS] Czechoslovakia ............... PV3974

[51] Int. Cl.$^5$ ............................................. C08F 26/08
[52] U.S. Cl. ................................. 526/264; 351/160 H
[58] Field of Search .................... 526/264; 351/160 H

[56] References Cited

FOREIGN PATENT DOCUMENTS 993877 7/1976 Canada ................................. 260/324

Primary Examiner—Joseph L. Schofer
Assistant Examiner—Alex H. Walker
Attorney, Agent, or Firm—Leydig, Voit & Mayer

[57] ABSTRACT

The solution concerns hydrophilic transparent crosslinked copolymers and a method for their production.

A substance of the solution is the hydrophilic copolymer which can be prepared by the radical copolymerization of monomers with the general formula I, where R is hydrogen or methyl, alone or in their mutual combinations or by copolymerization of the monomers with general formula I and the monomers with general formula II, where $R^1$ means hydrogen or methyl and X is a group $OCH_2CH_2OH$, $OCH_2CH(OH)CH_3$, $OCH_2CH(OH)CH_2OH$, $(OCH_2CH_2)_3OH$, $(OCH_2CH_2)_2OH$, alkoxyl from $OCH_3$ to $OC_{16}H_{33}$, $NH_2$, $NHCH_2(OH)CH_3$, $N(C_2H_5)_2$, and $NH\text{-tert-}C_4H_9$, whereas the content of monomers of the general formula I and II amounts to 40 to 99.99 wt.-% of the entire mixture, where at least 5 wt.-% form the monomers of general formula I, with 0.01 to 60 wt.-% of a crosslinking agent, related to the entire monomer mixture, which has at least two olefinic double bonds, in the presence of radical initiators.

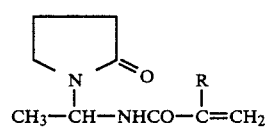

general formula I

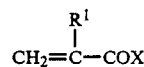

general formula II

12 Claims, No Drawings

HYDROPHILIC TRANSPARENT CROSSLINKED COPOLYMER AND THE METHOD FOR PRODUCING THEREOF

The invention concerns a hydrophilic transparent crosslinked copolymer, which is particularly suitable for the production of soft contact lenses and medical purposes, and also to the method of its production.

Hydrophilic materials used for the production of hydrophilic contact lenses and prepared by the crosslinking polymerization from 2-hydroxyethyl methacrylate (HEMA) have several excellent properties, e.g., good mechanical properties, optical parameters and a very good tolerance at wearing. Their certain disadvantage consists in a relatively low permeability for oxygen, while the extent of permeability in hydrogels is influenced by the water content in gel.

It is commonly known that the diffusion of oxygen is increased by increasing the content of water in gel. On the other hand, however, mechanical properties of the hydrogen may be deteriorated. One of the ways for obtaining the more hydrophilic materials, which are more permeable for oxygen, is the copolymerization of less hydrophilic monomers with more hydrophilic monomers, of course, a sufficient mechanical strength has to be retained. Thus, for example, hydrophilic properties of poly-HEMA were improved by the copolymerization of HEMA with diglycol monomethacrylate, glycerol monomethacrylate, or N-vinylpyrrolidone. However, a disadvantage of the copolymerization of acrylic or methacrylic monomers with N-vinylpyrrolidone is that the formed copolymers contain a high fraction of the corresponding homopolymers due to the insuitable monomer reactivity ratios. Such polymeric products exhibit some unfavourable properties, e.g., a high water extractable portion, or the phase separation occurs, the consequence of which is developing of opacity.

A subject of this invention is a hydrophilic copolymer, which can be prepared by the radical copolymerization of the monomers with general formula I

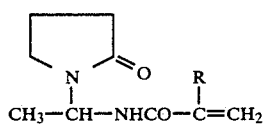

where R is hydrogen or methyl, either alone or in their combinations or by the copolymerization of the monomers with general formula I and the monomers with general formula II

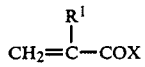

where $R^1$ is hydrogen or methyl, and X is a group $OCH_2CH_2OH$, $OCH_2CH(OH)CH_3$, $OCH_2CH(OH)C-H_2OH$, $(OCH_2CH_2)_3OH$, $(OCH_2CH_2)_2OH$, alkoxyl from $OCH_3$ to $OC_{16}H_{33}$, $NH_2$, $NHCH_2CH(OH)CH_3$, $N(C_2H_5)_2$, NH-tert-$C_4H_9$, OH, ONa, OK, or $ONH_4$, whereas the content of monomers I and II amounts to 40 to 99.99 wt.-% of the entire mixture with at least 5 wt.-% of the monomer with general formula I, and 0.01 to 60 wt.-% of a crosslinking agent with at least two olefinic double bonds related to the entire monomer mixture, in the presence of radical initiators.

The hydrophilic copolymer according to the invention may be advantageously prepared by copolymerization of 15 to 25 wt.-% of the monomer with general formula I with 75 to 85 wt.-% of the monomer with general formula II, where $R^1$ is methyl and X is the group $OCH_2CH_2OH$ in the presence of 0.1 to 0.5 wt.-% of a crosslinking agent. This material contains, after swelling with water, around 50 wt.-% of water.

The copolymer may be also advantageously prepared, for example, by copolymerization of 45 to 55 wt.-% of the monomer with general formula I with 55 to 45 wt.-% of the monomer with general formula II, where $R^1$ means methyl and X means the group $OCH_2CH_2OH$, in the presence of 0.1 to 1 wt.-% of a crosslinking agent. After swelling in water, this material contains around 75 wt.-% of water.

As another example it may serve the hydrophilic copolymer prepared by copolymerization of 97 to 99.7 wt.-% of monomers with general formula I with 0.3 to 3 wt.-% of a crosslinking agent. This material after swelling with water contains around 86% of water.

The monomers with general formula I contain in their structure an alkylpyrrolidone grouping and increase the hydrophilicity of the macromolecule similarly as N-vinylpyrrolidone, however, they avoid its disadvantages ensuing from its above mentioned low ability to copolymerize with acrylic or methacrylic derivatives. The copolymerization of the monomers with general formula I with highly hydrophilic monomers, as are diethylene glycol monomethacrylate, 2,3-dihydroxypropyl methacrylate, does not always give the materials with improved hydrophilic properties. Nevertheless, the new polymeric materials obtained may be employed for some medical applications. Another advantage is, that the monomer of general formula I, where R=H (R. A. Hickner et al., J. Org. Chem. 32, 729 (1967); D. Randall, B. Waxman—GAF Corp., Canadian Patent 993,877 (1976)) and the monomer of general formula I, where R is methyl (prepared analogously as the preceding monomer according to the referred literature by using anhydrous aluminum trichloride or a mixture of boron trifluoride etherate with p-toluenesulfonic acid as catalysts, m.p. 112°–113° C.) are crystalline compounds which can be easily prepared in a high purity.

The crosslinking agent is advantageously selected from the group comprising multifunctional esters or amides of acrylic or methacrylic acid.

The polymerization is carried out by the radical mechanism (either thermally or photo initiated) and the choice of initiator is not decisive for the polymerization.

Radical initiators may be selected from the group comprising azo compounds, peroxides, peroxocarbonates, persulfates, photoinitiators based on benzoin ethers and their derivatives, or initiation redox system, as are advantageously persulfate-disulfite, persulfate-ascorbic acid, persulfate-alkylamines, benzoyl peroxide-alkylamines.

Thus, the copolymerization can be carried out without solvent or in the presence of polar solvents, as are advantageously glycerol, glycols and their derivatives, water, dimethylformamide, diacetin, 2-propanol, or their mixtures.

The copolymerization may be carried out at the same time with molding, for example, by centrifugal casting or casting in open and closed molds, one part of which may be advantageously movable.

If the copolymerization is carried out in the absence of polar solvents, the resulting copolymer block is above all suitable for such applications which require additional mechanical working (for example, contact lenses prepared by turning). But some articles can be prepared directly by this copolymerization in bulk.

In the presence of individual polar solvents or their mixtures mentioned above, the prepared copolymer contains the chosen appropriate content of a solvent and is suitable for casting, e.g., for centrifugal casting of contact lenses. The used solvent, which would prevent from mechanical working in the first case, favourably influences here, on the contrary, pressures which appear at swelling of the prepared article.

It is also possible and suitable in the production of higher swelling turned contact lenses, to extract the solvent or water-soluble low-molecular weight fractions present in the crosslinked copolymer, which was prepared in the presence of above mentioned polar solvents, with water and then to dry the copolymer to a constant weight. The resulting xerogel is perfectly suited for mechanical working. In this case it is advantageous to carry out drying in the medium of saturated steam heated above the glass-transition temperature $T_g$ of the prepared copolymer.

This procedure is advantageous, because, in contrast to the methods for production of contact lenses from various types of xerogels hitherto used, it not only enables the perfect washing off of the low-molecular weight components as it was said above, but also provides a more ordered structure during polymerization from the point of view of inner stresses of cross links. This ordered structure is retained during drying and after reswelling of the contact lens made from the xerogel prepared in this way. The threedimensional structure without internal stresses obtained as a consequence of the ordered structure of cross links can be visualized in polarized light. In this method of preparation also a high conversion of polymerizing component is achieved in contrast to the preparation of xerogel materials by the polymerization without solvent.

The copolymers according to the invention have good mechanical properties which are suitable for applications according to the invention. The copolymers according to the invention are practically without water soluble extracts and provide a sufficiently large content of equilibrium water in the resulting gel, so that they can be used for the production of contact lenses and other medical preparations.

The invention is further illustrated in the examples of performance. The following abbreviations are used in the examples:

PEA N-[1-(2-oxo-1-pyrrolidinyl)ethyl]acrylamide (the compound of general formula I, where R is hydrogen)
PEM N-[1-(2-oxo-1-pyrrolidinyl)ethyl]methacrylamide (the compound of general formula I, where R is methyl)
MBA methylene-bis-acrylamide
HEMA 2-hydroxyethyl methacrylate
HEA 2-hydroxyethyl acrylate
EDMA ethylene glycol dimethacrylate
ABIN azo-bis-isobutyronitrile

EXAMPLE 1

A mixture of 29.7 wt.-% PEA, 0.3 wt.-% MBA and 70 wt.-% water was polymerized with 0.05 wt.-% $(NH_4)_2S_2O_8$ (calculated on the total mixture) at 70° C. for 16 hours in an inert atmosphere. The obtained polymer was transparent, elastic, with the shear modulus $G=0.0043$ MPa. The equilibrium content of water in the gel prepared in this way was 92 wt.-%.

EXAMPLE 2

A mixture of 49.7 wt.-% PEA, 0.3 wt.-% MBA and 50 wt.-% water was polymerized with 0.05 wt.-% $(NH_4)_2S_2O_8$ (calculated on the total mixture) at 70° C. for 16 hours in an inert atmosphere. The obtained polymer was transparent, elastic, with the shear modulus $G=0.016$ MPa and the equilibrium content of water 86 wt.-%.

EXAMPLE 3

A mixture of 12 wt.-% PEA, 87.7 wt.-% HEMA and 0.3 wt.-% EDMA was polymerized with 0.2 wt.-% ABIN (calculated on the total mixture) at 60° C. for 16 hours in an inert atmosphere. Equilibrium content of water in the gel prepared in this way was 44 wt.-%. The gel was clear, elastic and had the shear modulus $G=0.170$ MPa.

EXAMPLE 4

A mixture of 12 wt.-% PEA, 87.05 wt.-% HEMA and 0.95 wt.-% diethylene glycol diemthacrylate was polymerized with 0.2 wt.-% ABIN (calculated on the total mixture) at 60° C. for 16 hours in an inert atmosphere. Equilibrium content of water in the gel prepared in this way was 41 wt.-%. The obtained gel was clear, elastic and had the shear modulus $G=0.180$ MPa.

EXAMPLE 5

A mixture of 46.23 wt.-% PEA, 11.6 wt.-% HEMA, 0.17 wt.-% EDMA and 42 wt.-% water was polymerized with 0.5 wt.-% ABIN (calculated on the total mixture) at 60° C. for 16 hours in an inert atmosphere. Equilibrium content of water in the gel prepared in this way was 87 wt.-%. The obtained gel was clear, elastic and had the shear modulus $G=0.030$ MPa.

EXAMPLE 6

A mixture of 22.4 wt.-% PEA, 33.43 wt.-% HEMA, 0.17 wt.-% EDMA and 45 wt.-% water was polymerized with 0.5 wt.-% ABIN (calculated on the total mixture) at 60° C. for 16 hours in an inert atmosphere. Equilibrium content of water in the gel prepared in this way was 83 wt.-%. The obtained gel was clear, elastic and had the shear modulus 0.030 MPa.

EXAMPLE 7

A mixture of 41.00 wt.-% HEMA, 28 wt.-% PEA, 1 wt.-% triglycol dimethacrylate and 30 wt.-% water was polymerized with 0.5 wt.-% ABIN (calculated on the total mixture) at 60° C. for 16 hours in an inert atmosphere. Equilibrium content of water in the gel prepared in this way was 73 wt.-%. The obtained gel was clear, elastic and had the shear modulus $G=0.060$ MPa.

EXAMPLE 8

A mixture of 20 wt.-% PEA, 29.85 wt.-% HEMA, 0.15 wt.-% EDMA and 50 wt.-% water was polymerized with 0.5 wt.-% ABIN (calculated on the total mixture) at 60° C. for 16 hours in an inert atmosphere. Equilibrium content of water in the gel prepared in this way was 78 wt.-%. The obtained gel was clear, elastic and had the shear modulus G=0.040 MPa.

EXAMPLE 9

A mixture of 14 wt.-% PEA, 55.79 wt.-% HEMA, 0.21 wt.-% EDMA and 30 wt.-% water was polymerized with 0.5 wt.-% ABIN (calculated on the total mixture) at 60° C. for 16 hours in an inert atmosphere. Equilibrium content of water in the gel prepared in this way was 53 wt.-%. The obtained gel was clear, elastic and had the shear modulus G=0.110 MPa.

EXAMPLE 10

A mixture of 10 wt.-% PEA, 39.85 wt.-% HEMA, 0.15 wt.-% EDMA and 50 wt.-% dimethylformamide was polymerized with 0.2 wt.-% ABIN (calculated on the total mixture) at 60° C. for 16 hours in an inert atmosphere. Equilibrium content of water in the gel prepared in this way was 54 wt.-%. The obtained gel was clear, elastic and had the shear modulus G=0.056 MPa.

EXAMPLE 11

A mixture of 10 wt.-% PEA, 39.00 wt.-% diethylene glycol monomethacrylate (DEGMA), 1.00 wt.-% diglycol dimethacrylate and 50 wt.-% dimethylsulfoxide was polymerized with 0.2 wt.-% ABIN (calculated on the total mixture) at 60° C. for 16 hours in an inert atmosphere. Equilibrium content of water in the gel prepared in this way was 64 wt.-%. The obtained gel was clear, elastic and had the shear modulus 0.056 MPa.

EXAMPLE 12

A mixture of 15 wt.-% PEM, 34.85 wt.-% HEMA, 0.15 wt.-% EMDA and 50 wt.-% dimethylsulfoxide was polymerized with 0.2 wt.-% ABIN (calculated on the total mixture) at 60° C. for 16 hours in an inert atmosphere. Equilibrium content of water in the gel prepared in this way was 65 wt.-%. The obtained gel was clear, elastic and had the shear modulus 0.955 MPa.

EXAMPLE 13

A mixture of 55.79 wt.-% HEMA, 14 wt.-% PEA, 0.21 wt.-% EDMA and 30 wt.-% water was polymerized with 0.5 wt.-% ABIN (calculated on the total mixture) at 60° C. for 16 hours in an inert atmosphere. Equilibrium content of water in the gel prepared in this way was 51 wt.-%. The obtained gel was clear, elastic and had refraction index at 25° C. $n_{25}=1.407$, tensile strength 0.217 MPa and elongation 146%.

EXAMPLE 14

A mixture of 17.5 wt.-% PEA, 52.29 wt.-% HEMA, 0.21 wt.-% EDMA and 30 wt.-% water was polymerized with 0.5 wt.-% ABIN (calculated on the total mixture) at 60° C. for 16 hours in an inert atmosphere. Equilibrium content of water in the gel prepared in this way was 56 wt.-%. The obtained gel was clear, elastic and had refraction index $n_{25}=1.398$, tensile strength 0.166 MPa and elongation 150%.

EXAMPLE 15

A mixture of 21 wt.-% PEA, 48.79 wt.-% HEMA, 0.21 wt.-% EDMA and 30 wt.-% water was polymerized with 0.5 wt.-% ABIN (calculated on the total mixture) at 60° C. for 16 hours in an inert atmosphere. Equilibrium content of water in the gel prepared in this way was 61 wt.-%. The obtained gel was clear, elastic and had refraction index $n_{25}=1.391$, tensile strength 0.179 MPa and elongation 168%.

EXAMPLE 16

A mixture of 28 wt.-% PEM, 41.79 wt.-% HEMA, 0.21 wt.-% hexamethylenebisacrylamide and 30 wt.-% water was polymerized with 0.5 wt.-% ABIN (calculated on the total mixture) at 60° C. for 16 hours in an inert atmosphere. Equilibrium content of water in the gel prepared in this way was 62 wt.-%. The obtained gel was clear, elastic and had refraction index $n_{25}=1.379$, tensile strength 0.092 MPa and elongation 98%.

EXAMPLE 17

A mixture of 35 wt.-% PEA, 34.79 wt.-% HEMA, 0.21 wt.-% EDMA and 30 wt.-% water was polymerized with 0.5 wt.-% ABIN (on the total mixture) at 60° C. for 16 hours in an inert atmosphere. Equilibrium content of water in the gel prepared in this way was 75 wt.-%. The obtained gel was clear, elastic and had refraction index $n_{25}=1.371$, tensile strength 0.060 MPa and elongation 64%.

EXAMPLE 18

A mixture of 17.3 wt.-% PEA, 52 wt.-% HEMA, 0.7 wt.-% EDMA and 30 wt.-% water was polymerized with 0.5 wt.-% ABIN (on the total mixture) at 60° C. for 16 hours in an inert atmosphere. Equilibrium content of water in the gel prepared in this way was 52 wt.-%. The obtained gel was clear, elastic and had refraction index $n_{25}=1.410$, tensile strength 0.157 and elongation 43%.

EXAMPLE 19

A mixture of 17 wt.-% PEA, 50.9 wt.-% HEMA, 2.1 wt.-% EDMA and 30 wt.-% water was polymerized with 0.5 wt.-% ABIN (on the total mixture) at 60° C. for 16 hours in an inert atmosphere. Equilibrium content of water in the gel prepared in this way was 43 wt.-%. The obtained gel was clear, elastic and had refraction index $n_{25}=1.428$, tensile strength 0.218 MPa and elongation 16%.

EXAMPLE 20

A mixture of 16.6 wt.-% PEA, 49.9 wt.-% HEMA, 3.5 wt.-% EDMA and 30 wt.-% water was polymerized with 0.5 wt.-% ABIN (on the total mixture) at 60° C. for 16 hours in an inert atmosphere. Equilibrium content of water in the gel prepared in this way was 37 wt.-%. The obtained gel was clear, elastic and had refraction index $n=1.439$, tensile strength 0.312 MPa and elongation 16%.

EXAMPLE 21

A mixture of 18.75 wt.-% PEA, 56.03 wt.-% HEMA, 0.22 wt.-% EDMA and 25 wt.-% water was polymerized with 0.5 wt.-% ABIN (on the total mixture) at 60° C. for 16 hours in an inert atmosphere. Equilibrium content of water in the gel prepared in this way was 53 wt.-%. The obtained gel was clear, elastic and had refraction index $n_{25}=1.400$, tensile strength 0.138 MPa and elongation 80%.

EXAMPLE 22

A mixture of 15 wt.-% PEA, 44.82 wt.-% HEMA, 0.18 wt.-% EDMA and 40 wt.-% water was polymerized with 0.5 wt.-% ABIN (on the total mixture) at 60° C. for 16 hours in an inert atmosphere. Equilibrium content of water in the gel prepared in this way was 56 wt.-%. The obtained gel was clear, elastic and had refraction index $n_{25} = 1.398$, tensile strength 0.105 MPa and elongation 82%.

EXAMPLE 23

A mixture of 12.5 wt.-% PEA, 37.35 wt.-% HEMA, 0.15 wt.-% EDMA and 50 wt.-% water was polymerized with 0.5 wt.-% ABIN (on the total mixture) at 60° C. for 16 hours in an inert atmosphere. Equilibrium content of water in the gel prepared in this way was 57 wt.-%. The obtained gel was clear, elastic and had refraction index $n_{25} = 1.396$, tensile strength 0.097 MPa and elongation 93%.

EXAMPLE 24

The gel prepared from a mixture with the same composition and under the same conditions as in example 13, with the distinction that PEA was replaced with PEM, was clear, elastic and had the equilibrium content of water 50 wt.-% and refraction index $n_{25} = 1.414$.

EXAMPLE 25

From the mixture according to example 14, where the component PEA was replaced with PEM, it was prepared under the same conditions a clear, elastic gel with the equilibrium content of water 52 wt.-% and refractive index $n_{25} = 1.409$.

EXAMPLE 26

From the mixture according to example 15, where the component PEA was replaced with PEM, it was prepared under the same conditions a clear, elastic gel with the equilibrium content of water 58 wt.-% and refraction index $n_{25} = 1.400$.

EXAMPLE 27

From the mixture according to example 16, where the component PEA was replaced with PEM, it was prepared under the same conditions a clear, elastic gel with the equilibrium content of water 62 wt.-% and refraction index $n_{25} = 1.390$.

EXAMPLE 28

From the mixture according to example 17, where the component PEA was replaced with PEM, it was prepared under the same conditions a clear, elastic gel with the equilibrium content of water 71 wt.-% and refraction index $n_{25} = 1.374$.

EXAMPLE 29

From the mixture according to example 18, where the component PEA was replaced with PEM, it was prepared under the same conditions a clear, elastic gel with the equilibrium content of water 51 wt.-% and refraction index $n_{25} = 1.413$.

EXAMPLE 30

From the mixture according to example 19, where the component PEA was replaced with PEM, it was prepared under the same conditions a clear, elastic gel with the equilibrium content of water 45 wt.-% and refraction index $n_{25} = 1.424$.

EXAMPLE 31

A mixture of 50 wt.-% PEA, 0.30 wt.-% EDMA and 49.7 wt.-% water was polymerized with 0.5 wt.-% $(NH_4)_2S_2O_8$ at 70° C. The obtained transparent elastic gel contained in the equilibrium 85 wt.-% water.

EXAMPLE 32

A mixture of 40 wt.-% PEA, 0.5 wt.-% 3',3'-ethylidenebis(1-vinyl-2-pyrrolidone), 2 wt.-% methacrylic acid and 57.5 wt.-% $H_2O$ was polymerized with 0.2 wt.-% ABIN calculated on the total monomer mixture at 60° C. for 16 hours. The obtained polymer was an elastic gel with the equilibrium content of water 78 wt.-%.

EXAMPLE 33

A mixture of 17.27 wt.-% PEM, 49.50 wt.-% HEMA, 31.88 wt.-% $H_2O$ and 1.85 wt.-% EDMA was polymerized with 0.5 wt.-% dicyclohexyl peroxocarbonate (calculated on the total mixture) at 60° C. for 16 hours. The resulting elastic gel contained in equilibrium 45 wt.-% water.

EXAMPLE 34

A mixture of 17 wt.-% PEM, 49 wt.-% DEGMA, 32 wt.-% dimethylsulfoxide and 2 wt.-% diethylene glycol dimethacrylate was polymerized with 0.1 wt.-% diisopropyl peroxocarbonate at 60° C. for 16 hours. The obtained hydrophilic gel contained 78 wt.-% water in equilibrium.

EXAMPLE 35

A mixture of 31.36 wt.-% PEA, 20.94 wt.-% N-2-hydroxypropylmethacrylamide, 47.55 wt.-% methanol and 0.15 wt.-% MBA was polymerized with 0.4 wt.-% ABIN at 60° C. for 16 hours in an inert atmosphere. The equilibrium content of water in the gel prepared in this way was 91 wt.-%. The obtained gel was slightly opalescent and elastic.

EXAMPLE 36

A mixture of 31.48 wt.-% PEA, 21.29 wt.-% diethylacrylamide, 47.08 wt.-% methanol and 0.15 wt.-% MBA was polymerized with 0.4 wt.-% ABIN at 60° C. for 16 hours in an inert atmosphere. Equilibrium content of water in the gel prepared in this way was 93 wt.-%. The obtained gel was slightly opalescent and elastic.

EXAMPLE 37

A mixture of 27.11 wt.-% PEA, 18.98 wt.-% MMA, 53.76 wt.-% methanol and 0.15 wt.-% MBA was polymerized with 0.4 wt.-% ABIN at 60° C. for 16 hours in an inert atmosphere. Equilibrium content of water in the gel obtained in this way was 77 wt.-%. The prepared gel was slightly opalescent and elastic.

EXAMPLE 38

A mixture of 27.38 wt.-% PEA, 18.30 wt.-% tert-butyl methacrylate, 54.1 wt.-% methanol and 0.15 wt.-% MBA was polymerized with 0.4 wt.-% ABIN at 60° C. for 16 hours in an inert atmosphere. Equilibrium content of water in the prepared gel was 54 wt.-%. The obtained gel was slightly opalescent and tough.

EXAMPLE 39

A mixture of 10.67 wt.-% PEM, 54.66 wt.-% HEMA, 31.57 wt.-% H$_2$O and 33.10 wt.-% EDMA was polymerized with 0.5 wt.-% ABIN at 60° C. for 16 hours in an inert atmosphere. Equilibrium content of water in the gel obtained in this way was 50 wt.-%. The prepared gel was slightly opalescent and elastic.

EXAMPLE 40

A mixture of 30.88 wt.-% PEM, 45.90 wt.-% HEMA, 23.08 wt.-% water and 0.14 wt.-% EDMA was polymerized with 0.5 wt.-% ABIN (calculated on the total monomer mixture) at 60° C. for 16 hours in an inert atmosphere. The obtained polymer contained 62 wt.-% water in equilibrium. It was clear and elastic.

EXAMPLE 41

A mixture of 41.11 wt.-% PEM, 27.40 wt.-% HEMA, 31.33 wt.-% water and 0.16 wt.-% EDMA was polymerized with 0.5 wt.-% diisopropyl peroxocarbonate at 60° C. for 16 hours. The obtained elastic transparent gel contained 78.3 wt.-% H$_2$O in equilibrium.

We claim:

1. Hydrophilic copolymer, prepared by the radical copolymerization of the monomers of general formula I

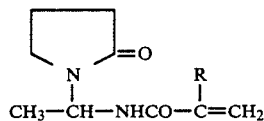
(I)

where R is hydrogen or methyl, either alone or in their combinations, or by copolymerization of the monomers with general formula I and the monomers with general formula II

(II)

where R$^1$ means hydrogen or methyl and X is a group OCH$_2$CH$_2$OH, OCH$_2$CH(OH)CH$_3$, OCH$_2$CH(OH)C-H$_2$OH, (OCH$_2$CH$_2$)$_3$OH, (OCH$_2$CH$_2$)$_2$OH, alkoxyl OCH$_3$ to OC$_{16}$H$_{33}$, NH$_2$, NHCH$_2$CH(OCH)CH$_3$, N(C$_2$H$_5$)$_2$, and NH-tert-C$_4$H$_9$, whereas the content of monomers with the general formulae I and II amounts to 40 to 99.99 wt.-% of the entire mixture, where at least 5 wt.-% is formed by the monomers of general formula I, and with 0.01 to 60 wt.-% of a crosslinking agent related to the entire monomer mixture, which contains at least two olefinic bonds, in the presence of radical initiators.

2. The hydrophilic copolymers according to claim 1, which can be prepared by the copolymerization of 15 to 25 wt.-% of the monomer of general formula I with 75 to 85 wt.-% of the monomer with formula II, where R$^1$ is methyl and X is the group OCH$_2$CH$_2$OH, in the presence of 0.1 to 0.5 wt.-% of a crosslinking agent.

3. The hydrophilic transparent copolymer according to claim 1, which can be prepared by the copolymerization of 45 to 55 wt.-% of the monomer of general formula I with 55 to 45 wt.-% of the monomer with general formula II, where R$^1$ means methyl and X means the group OCH$_2$CH$_2$OH, in the presence of 0.1 to 1 wt.-% of a crosslinking agent.

4. The hydrophilic transparent copolymer according to claim 1, which can be prepared by the copolymerization of 97 to 99.7 wt.-% of the monomer with general formula I with 0.3 to 3 wt.-% crosslinking agent.

5. The hydrophilic copolymer according to claim 1, wherein the crosslinking agent is selected from the group comprising multifunctional esters or amides of acrylic acid or methacrylic acid.

6. The hydrophilic copolymer according to claim 1, wherein the radical initiators are selected from the group comprising azo compounds, peroxides, peroxocarbonates, persulfates, photoinitiators based on benzoin ethers and their derivatives, and also initiation redox systems, advantageously persulfate-disulfite, persulfate-ascorbic acid, persulfate-alkylamines, benzoyl peroxide-alkylamines.

7. The hydrophilic copolymer according to claim 1, wherein the copolymerization is carried out in the presence of polar solvents, for example, glycerol, glycols and their derivatives, diacetine, 2-propanol, or their mixtures.

8. A method for producing the hydrophilic copolymer according to any one of claims 1 through 7, wherein the monomers of general formula I defined in claim 1 are copolymerized either alone or in mutual mixtures or in a mixture with monomers of general formula II defined in claim 1, wherein the content of monomers with general formulae I and II amounts to 40 to 99.99 wt.-% of the entire mixture, while at least 5 wt.-% is formed by the monomers of general formula I, with 0.01 to 60 wt.-% of a crosslinking agent, related to the entire monomer mixture, having at least two olefinic double bonds under the conditions of radical polymerization.

9. The method according to claim 8, wherein the copolymerization is carried out in the presence of a polar solvent or a mixture of polar solvents.

10. The method according to claim 8 wherein the copolymerization is carried out at the same time with molding.

11. The method according to claim 8 wherein the molding is carried out by centrifugal casting or casting in open or closed molds.

12. The method according to claim 8 wherein the centrifugal casting or casting is used for molding of a contact lens.

* * * * *